Patented June 14, 1938

2,120,755

UNITED STATES PATENT OFFICE 2,120,755

BUTYL ESTER COMPOSITIONS

Lucas P. Kyrides, Webster Groves, Mo., assignor to Monsanto Chemical Company, St. Louis, Mo., a corporation of Delaware No Drawing. Application January 9, 1937, Serial No. 119,756

4 Claims. (Cl. 260—103)

This invention relates to a novel class of high boiling solvents or plasticizers for cellulose esters, cellulose ethers, natural resins, as well as synthetic resins, the present application being a continuation in part of my co-pending application Serial No. 618,305, filed June 20, 1932, now Patent No. 2,073,937; attention is drawn to my co-pending application, Serial No. 648,986, filed December 27, 1932, now Patent No. 2,073,938, and my co-pending application, Serial No. 148,737, filed on June 17, 1937, pertaining to the use of the esters disclosed herein.

In my co-pending applications I have disclosed and claimed a novel class of ester compositions characterized in that they embody esters of oxy acetic acid or its homologues. This invention pertains to esters of the same general class as are disclosed in the applications above identified and which have been found to be particularly well suited to the manufacture of films, lacquers, varnishes, threads, molding compositions, impregnating compositions, etc., for the purpose of imparting desirable characteristics to the ultimate product.

The ester compositions disclosed herein as plasticizers or high boiling solvents are high boiling liquids or low melting solids which are permanently monomeric, non-resinifiable and non-polymerizable. In this respect they are distinguishable from the vinyl type ester compositions which do polymerize and resinify. These new plasticizers are relatively non-volatile at ordinary temperatures and are compatible with and impart a degree of plasticity, flexibility and resistance to fracture to the ultimate product which may be desired. An outstanding characteristic of the class of compositions contemplated by the present invention resides in their inordinate degree of compatibility, not only with cellulose derivatives but also with a large variety of synthetic and natural resins.

In general the novel class of compositions, the use of which is herein contemplated, consists of neutral esters of carboxylic acids containing one oxy (hydroxy) acetic acid ester group or ester homologues of oxy acetic acid, including glycollic acid, lactic acid, beta oxy propionic acid, alpha and beta oxy butyric acid, etc. These ester compositions may take a form in which an ether group is present, as, for example, in the case of neutral esters of diglycollic acid or preferably they may take the form in which the oxy group is esterified with an acid group as in the case of the ethyl glycollate ester of a monocarboxylic aliphatic or aromatic acid such as benzoic acid. Another example of compositions which has been found to have inordinate solvent properties is the neutral monoglycollate derivatives of dicarboxylic acids, such, for example, as the ethyl glycollate ester of the monoethyl ester of phthalic acid which may be represented structurally as follows:

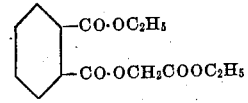

The alcohols which may be employed in preparing the esters may be alkyl or aralkyl alcohols, including cyclic alcohols, as well as an aryl alcohol (phenols) or ether substituted alkyl alcohols such as the monoalkyl ether of glycol, an example of which is the monoethyl ether of ethylene glycol. In lieu of the phthalic acid one may substitute other dicarboxylic acids, such as chlorphthalic acid, sebacic acid, adipic acid, diglycollic acid, thiodiglycollic acid or their anhydrides.

The following example will serve to illustrate the preparation of compositions, the use of which is contemplated herein, to wit: the ethyl glycollate ester of the monoethyl ester of phthalic acid, it being understood that the invention is not limited to any specific method of preparing the plasticizing compositions.

The monosodium salt of ethyl phthalate is first prepared by refluxing rapidly, preferably with mechanical agitation, 400 kilos of phthalic anhydride and 880 liters of absolute ethyl alcohol. The mixture is then allowed to cool to approximately 50° C., after which 159 kilos of anhydrous sodium carbonate are added slowly in order to avoid violent interaction. The resulting mixture is then heated, preferably with agitation, to assure the completion of the reaction. Thereafter 367.5 kilos of ethyl chloracetate (ethyl ester of chlor acetic acid) are added slowly while the mixture is agitated and maintained at the temperature of a steam bath, or preferably at the refluxing temperature.

The resulting reaction mixture is filtered from the sodium chloride which is washed with alcohol. The alcohol is recovered by distillation and the residual oil is steam distilled for three hours at approximately 100° C. The product so obtained is washed with a sodium carbonate solution until the solution is faintly alkaline to phenolphthalein. If desired the ester may be treated with decolorizing charcoal or activated carbon such as "Darco" in the usual manner. For this purpose 1% of "Darco", based on the weight of the oil product, is uniformly distributed therein after which the mixture is maintained at 90° C. for approximately one hour before removing the carbon by filtration.

The reaction may be represented as follows:

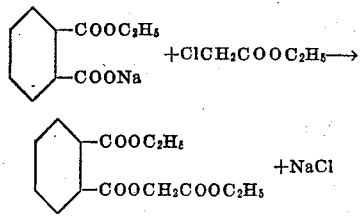

The product ethyl phthalyl ethyl glycollate boils at 223°–224° C. at 24 mm. without decomposition. It crystallizes at approximately 20° C.

By substituting sodium n-butyl phthalate for the sodium ethyl phthalate and n-butyl chlor acetate for the ethyl chlor acetate and otherwise proceeding substantially as described in connection with the ethyl phthalyl ethyl glycollate, one obtains butyl phthalyl butyl glycollate having the formula:

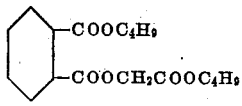

which is a colorless liquid that boils at 219° C. at 5 mm. and does not crystallize at temperatures as low as −35° C.

By reacting sodium methyl phthalate with ethyl chlor acetate and otherwise proceeding substantially as described in connection with the ethyl phthalyl ethyl glycollate one obtains the methyl phthalyl ethyl glycollate which is a colorless liquid that boils at 189° C. at 5 mm. and remains liquid at temperatures as low as −35° C. and has the possible structural formula:

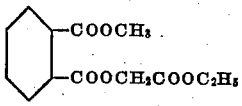

In lieu of the chloracetate ester one may employ an ester of the lower mono chlor substituted fatty acids such as chlor propionic acid or a chlor butyric acid.

Obviously, in lieu of the ethyl sodium phthalate employed in the foregoing example, one may prepare the corresponding methyl, propyl, butyl, benzyl, as well as phenyl sodium phthalate. Similarly, in lieu of the ethyl ester of chlor acetic acid, one may substitute the chlor acetic acid ester of cresol, phenol or of methyl, propyl, butyl, amyl, or benzyl alcohol, as well as of mono alkyl ether esters of glycol such as the mono ethyl ether ester of ethylene glycol and a dialkyl ether ester of glycerol, etc. The esters of chloracetic acid may be replaced by the esters of other chlor fatty acids such as the alpha or beta chlor propionic acid esters or mixtures thereof.

The manner of using the products described herein as plasticizers or softeners is fully set forth in my co-pending applications identified above, wherein such use is specifically claimed, to which reference is hereby made. In the instant application, the compounds specifically claimed are the butyl glycollate butyl esters of polycarboxylic acids whether they be of an aliphatic or aromatic nature and which may be represented structurally as follows:

where $R_1$ is a divalent hydrocarbon radical and $R_2$ is a divalent hydrocarbon radical. When the dicarboxylic acid of the ester is phthalic acid, the group represented in the formula as

would be the phthalyl group; in the case of succinic acid the group would be the succinyl group; maleic acid, the maleyl group; chlorphthalic acid, the chlorphthalyl group; etc.

While I prefer to use the normal butyl alcohol for most purposes, nevertheless other butyl alcohols may be employed such, for example, as the secondary alcohol.

What I claim is:

1. A neutral ester having the formula:

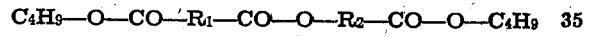

where $R_1$ is a divalent hydrocarbon group, and $R_2$ is a saturated divalent paraffinic hydrocarbon group.

2. A neutral ester having the formula:

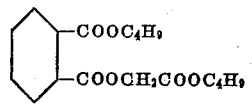

3. A neutral ester having the formula:

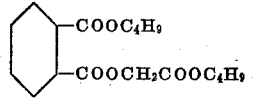

where the expression $C_4H_9$ represents a normal butyl group.

4. A neutral ester having the formula:

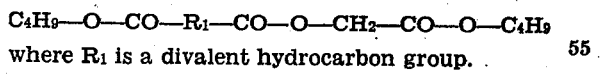

where $R_1$ is a divalent hydrocarbon group.

LUCAS P. KYRIDES.